(12) United States Patent
Kim et al.

(10) Patent No.: US 7,621,189 B2
(45) Date of Patent: Nov. 24, 2009

(54) APPARATUS AND METHOD FOR GENERATING AND SENSING TORSIONAL VIBRATIONS USING MAGNETOSTRICTION

(75) Inventors: Yoon Young Kim, Seoul (KR); Seung Hyun Cho, Ansan (KR); Soon Woo Han, Seoul (KR); Chan Il Park, Gunpo (KR)

(73) Assignee: Seoul National University Industry Foundation, Seoul (KR)

( * ) Notice: Subject to any disclaimer, the term of this patent is extended or adjusted under 35 U.S.C. 154(b) by 161 days.

(21) Appl. No.: 11/443,196

(22) Filed: May 31, 2006

(65) Prior Publication Data
US 2007/0113684 A1 May 24, 2007

(30) Foreign Application Priority Data
Nov. 19, 2005 (KR) .................. 10-2005-0111033

(51) Int. Cl.
*G01L 3/00* (2006.01)
(52) U.S. Cl. .................................. 73/862.335
(58) Field of Classification Search ..............................
73/862.331–862.336
See application file for complete search history.

(56) References Cited

U.S. PATENT DOCUMENTS

| | | | | |
|---|---|---|---|---|
| 2,806,533 A * | 9/1957 | Fleck | | 166/249 |
| 2,876,419 A * | 3/1959 | Gianola et al. | | 332/173 |
| 3,173,131 A * | 3/1965 | Perucca | | 365/224 |
| 3,693,402 A * | 9/1972 | Jones | | 73/11.05 |
| 3,697,867 A * | 10/1972 | Kleesattel | | 324/207.15 |
| 4,439,730 A * | 3/1984 | Kauffman | | 324/232 |
| 4,697,460 A * | 10/1987 | Sugiyama et al. | | 73/862.333 |
| 4,896,544 A * | 1/1990 | Garshelis | | 73/862.333 |
| 4,907,462 A * | 3/1990 | Obama et al. | | 73/862.335 |
| 4,964,308 A * | 10/1990 | Edo et al. | | 73/862.333 |
| 6,467,360 B1 * | 10/2002 | Bogdanov | | 73/862.333 |
| 6,598,491 B2 * | 7/2003 | Opie et al. | | 73/862.333 |
| 7,131,339 B2 * | 11/2006 | Kwun et al. | | 73/862.331 |

\* cited by examiner

*Primary Examiner*—Harshad Patel
*Assistant Examiner*—Octavia Davis
(74) *Attorney, Agent, or Firm*—Rothwell, Figg, Ernst & Manbeck, pc

(57) ABSTRACT

Provided is a method and apparatus for generating and sensing torsional vibrations using magnetostriction, in order to perform modal testing on a bar, a pipe, a shaft, a beam, or the like. The apparatus includes a torsional vibration generating part transmitting torsional vibrations to a test part having an arbitrary cross-section and a predetermined length, and a torsional vibration sensing part sensing the torsional vibrations generated from the torsional vibration generating part. The torsional vibration generating part and/or the torsional vibration sensing part includes a magnetostrictive body attached around the test part and made of a magnetostriction material, a first magnetic field forming part forming a magnetic field around the test part in a circumferential direction of the magnetostrictive body, and a second magnetic field forming part forming a magnetic field to the magnetostrictive body in a direction substantially perpendicular to the direction of the magnetic field formed by the first magnetic field forming part and in parallel with a longitudinal direction of the test part.

13 Claims, 10 Drawing Sheets

FIG. 19

APPARATUS AND METHOD FOR GENERATING AND SENSING TORSIONAL VIBRATIONS USING MAGNETOSTRICTION

CROSS-REFERENCE TO RELATED PATENT APPLICATION

This application claims the benefit of Korean Patent Application No. 10-2005-0111033, filed on Nov. 19, 2005, in the Korean Intellectual Property Office, the disclosure of which is incorporated herein in its entirety by reference.

BACKGROUND OF THE INVENTION

1. Field of the Invention

The present invention relates to an apparatus and method for generating and sensing torsional vibrations, which can perform torsional modal testing of a structure including shafts, beams and pipes, and more particularly, to an apparatus and method for generating and sensing torsional vibrations using magnetostriction, which can perform modal testing of a structure by subjecting a part to be tested to torsional vibrations using a magnetostrictive phenomenon and simultaneously sensing the torsional vibrations.

2. Description of the Related Art

When machines having parts such as pipes, beams, bars, shafts, or the like are designed, modal testing should be performed in order to assure the structural stability of the machine parts in various operational cases. Through a modal testing, we can measure the dynamic characteristics of a machine part including natural frequencies and mode shapes. For example, if the machine part is operating at the vibration frequency similar to its natural frequency, the machine part can be broken due to resonance. If we consider the natural frequency of the machine part during the process of the machine and machine element design, we can prevent the fracture due to their resonance. Therefore, it is preferable to performing the modal testing of machine parts during the process of the machine and machine element design.

Modal testing for grasping the dynamic characteristics of members such as pipes, beams, bars, shafts, or the like about torsional vibrations is performed by subjecting a part to be tested to torsional vibrations and measuring the response of the part. Therefore, there is a strong demand for an apparatus and method capable of generating torsional vibrations for testing a part and sensing the torsional vibrations of the part.

As used herein, magnetostriction or Joule effect denotes a phenomenon where a mechanical deformation of a part made of a ferromagnetic material and placed in a magnetic field is generated. On the other hand, inverse magnetostriction or Villari effect denotes a change of a magnetic state of a part when a stress is applied to the part.

Accordingly, the deformation of a part to be tested can be measured without mechanically contacting the part using magnetostriction. For this reason, magnetostriction has been widely applied in various fields where a contact sensor or an actuator cannot be employed.

SUMMARY OF THE INVENTION

The present invention provides an apparatus and method for generating and sensing torsional vibrations using magnetostriction and inverse magnetostriction in order to perform modal testing of a part having an arbitrary cross-section and a predetermined length, such as a bar, a pipe, a shaft, a beam, or the like.

According to an aspect of the present invention, there is provided an apparatus for generating and sensing torsional vibrations using magnetostriction, the apparatus including a torsional vibration generating part transmitting torsional vibrations to a test part having an arbitrary cross-section and a predetermined length; and a torsional vibration sensing part sensing the torsional vibrations generated from the torsional vibration generating part, wherein the torsional vibration generating part and/or the torsional vibration sensing part includes: a magnetostrictive body that is attached around the test part and is made of a magnetostriction material; a first magnetic field forming part forming a magnetic field around the test part in a longitudinal direction of the magnetostrictive body; and a second magnetic field forming part forming a magnetic field around the magnetostrictive body in a direction substantially perpendicular to the direction of the magnetic field formed by the first magnetic field forming part and in parallel with a longitudinal direction of the test part.

The magnetostrictive body may be formed of one member attached around the test part, or a predetermined number of magnetostrictive pieces that are attached around the test part at predetermined intervals from each other.

The magnetostrictive pieces may be attached to the test part using one adhesive material selected from the group consisting of epoxy, strong adhesive agents, and tapes.

The magnetostrictive pieces may have substantially the same size, and be attached at substantially equal intervals.

The first magnetic field forming part may include predetermined number of magnets disposed between the magnetostrictive pieces, and may further include predetermined number of yokes that are disposed between the magnetostrictive pieces and the magnets, and is made of a material having magnetic permeability higher than air. The magnet may be an electromagnet.

The magnetostrictive body may be made of a material having a large magnetostrictive deformation and selected from the group consisting of a ferromagnetic material such as Fe, Ni, and Co, or alloys thereof.

The torsional vibration generating part may be adapted to generate torsional vibrations on the test part by changing an intensity of the magnetic field formed by the second magnetic field forming part without changing an intensity of the magnetic field formed by the first magnetic field forming part so that the magnetostrictive body is deformed in a direction inclined with respect to the longitudinal direction of the test part by a magnetostrictive effect.

The torsional vibration sensing part may be adapted to measure torsional vibration characteristics of the test part by sensing the variation in the intensity of a magnetic field formed by the second magnetic field forming part when an inverse magnetostrictive phenomenon is generated due to torsional vibrations generated in the torsional vibration generating part while the magnetic field formed by the first magnetic field forming part is kept constant.

The second magnetic field forming part included in the torsional vibration generating part may comprises: an insulating body spaced apart from the test part by a predetermined gap to surround the test part; and a coil wound on a peripheral surface of the insulating body, whereby a current flowing through the coil is adjusted to change the intensity of a magnetic field formed by the second magnetic field forming part.

The second magnetic field forming part included in the torsional vibration sensing part may comprises: an insulating body spaced apart from the test part by a predetermined gap and surrounding the test part; and a coil wound on a peripheral surface of the insulating body, whereby the torsional vibrations are sensed according to the change of current induced through the coil.

According to another aspect of the present invention, there is provided a method of generating and sensing torsional vibrations using magnetostriction, including: determining a vibration generating position and a vibration sensing position of a test part and installing magnetostrictive pieces at the two positions, respectively; forming a first magnetic field around the installed magnetostrictive pieces; forming a second magnetic field in a direction substantially perpendicular to the first magnetic field at the magnetostrictive piece where the first magnetic field is formed; changing the intensity of the second magnetic field around the magnetostrictive piece attached at the vibration generating position to generate torsional vibrations on the test part; and sensing the change of the intensity of the second magnetic field around the magnetostrictive piece attached at the vibration sensing position to sense the torsional vibrations.

The forming of the first magnetic field may be performed by rubbing a magnet along the magnetostrictive piece to pre-magnetize the magnetostrictive piece.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described in detail with reference to the accompanying drawings, in which exemplary embodiments of the invention are shown.

Figure 1:
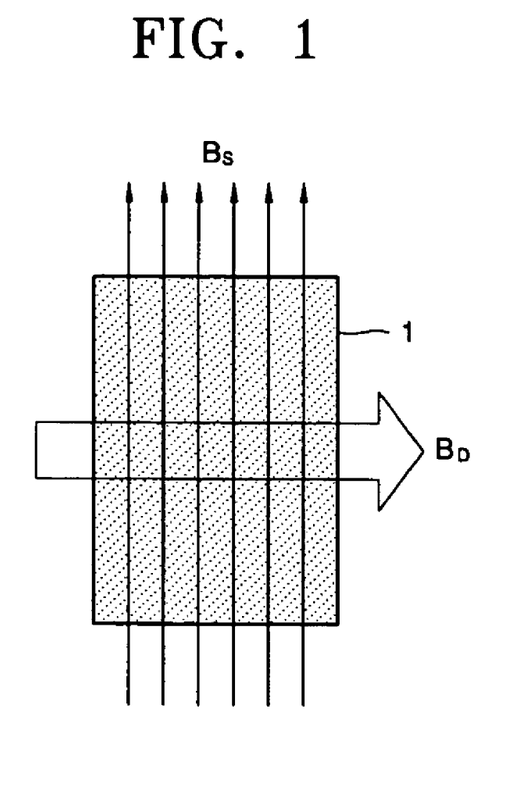
FIG. 1 is a view for explaining a magnetostrictive effect used in an apparatus for generating and sensing torsional vibrations according to an embodiment of the present invention.
Figure 2:
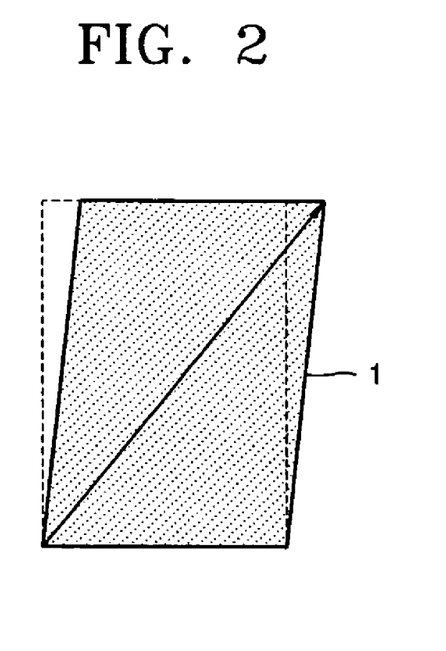
FIG. 2 is a view showing a profile of a magnetostrictive body that is deformed by the magnetic field shown in FIG. 1.
Figure 3:
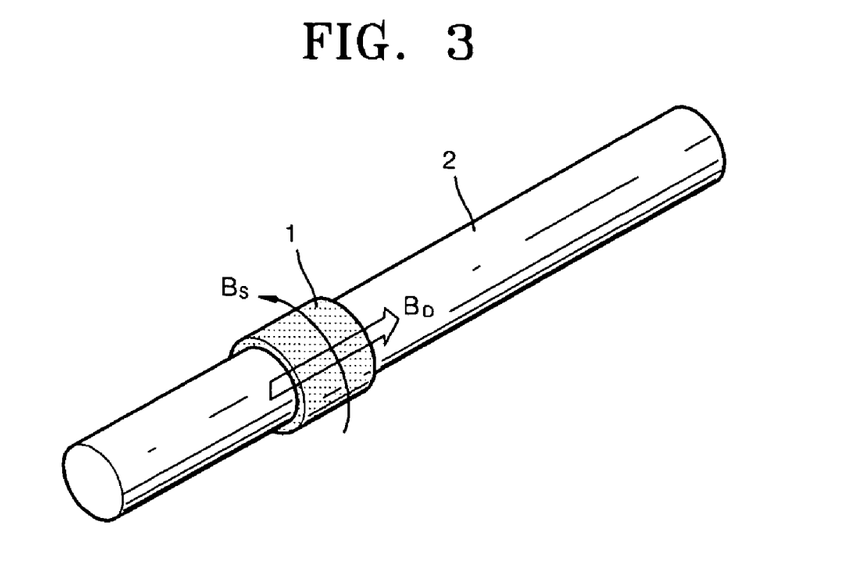
FIG. 3 is a perspective view of a component for generating torsional vibrations on a test part by an apparatus for generating and sensing torsional vibrations using magnetostriction according to an embodiment of the present invention.

FIGS. 1 through 3 are views for explaining a magnetostrictive effect used in an apparatus and method for generating and sensing torsional vibrations according to an embodiment of the present invention.

As shown FIG. 1, when two perpendicular magnetic fields, i.e., a first magnetic field $B_S$ and a second magnetic field $B_D$, are applied on a magnetostrictive body 1, the magnetostrictive body 1 may be deformed in a shear direction as shown in FIG. 2. That is, when the first magnetic field $B_S$ is kept constant, i.e., the intensity thereof is not changed, and the second dynamic magnetic field $B_D$ is changed, i.e., the intensity thereof is changed, the magnetostrictive body 1 is deformed according to the change of the second magnetic field $B_D$, as shown in FIG. 2. That is, by changing the intensity and cycle of the second magnetic field $B_D$, it is possible to control the deformation and cycle of the magnetostrictive body 1.

FIG. 3 illustrates an instance of using such a magnetostrictive effect in the case of a bar member. When a magnetostrictive body 1 is wound around a bar member 2, if a static magnetic field $B_S$ is applied on the magnetostrictive body 1 and a dynamic magnetic field $B_D$ is applied in a longitudinal direction of the bar member 2, substantially perpendicular to the direction of the static magnetic field $B_S$, the magnetostrictive body 1 is deformed. The magnetostrictive body 1 is tightly attached to the bar member 2 such that torsional vibrations may be generated in the bar member 2 according to the deformation of the magnetostrictive body 1. In addition, by adjusting the frequency and intensity of the dynamic magnetic field $B_D$, it is possible to adjust the frequency and intensity of torsional vibrations generated in the bar member 2.

Figure 4:
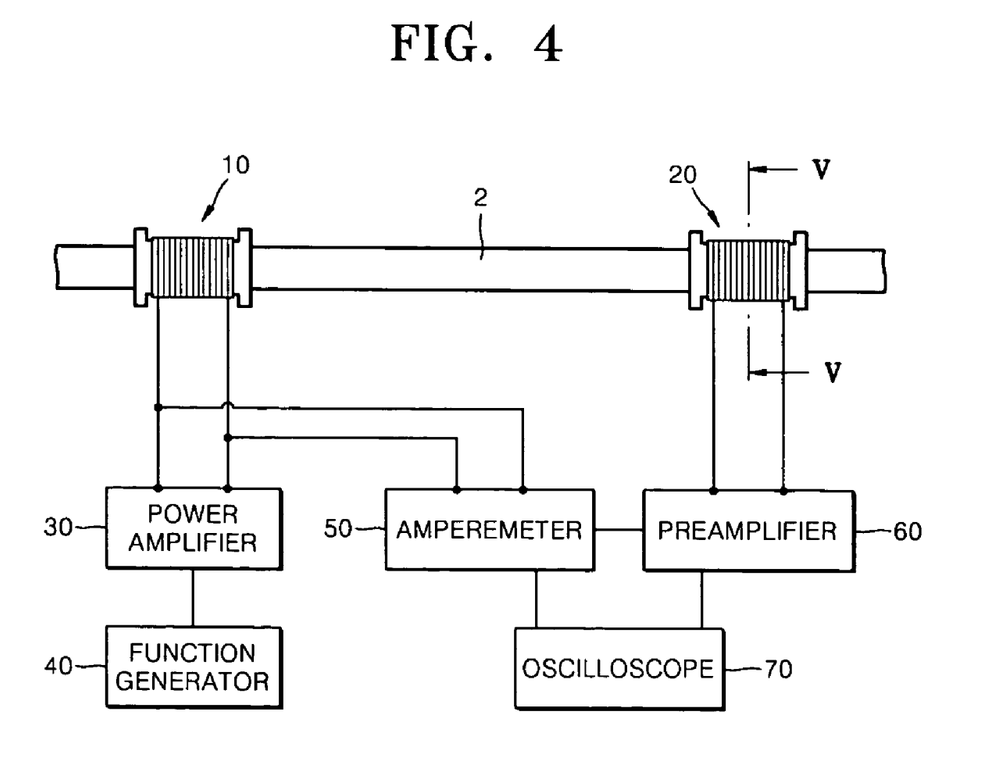
FIG. 4 is a schematic view of an apparatus for generating and sensing torsional vibrations using magnetostriction according to an embodiment of the present invention.
Figure 5:
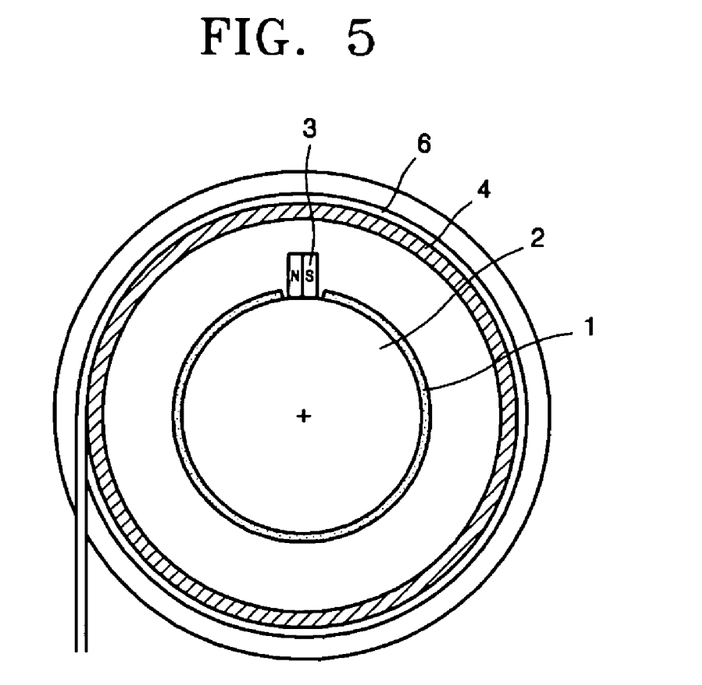
FIG. 5 is a cross-sectional view taken along line V-V in FIG. 4.

FIG. 4 is a view a schematic view of an apparatus for generating and sensing torsional vibrations using magnetostriction according to an embodiment of the present invention, and FIG. 5 is a cross-sectional view taken along line V-V in FIG. 4.

As shown in FIG. 4, the apparatus for generating and sensing torsional vibrations includes a torsional vibration generating part 10 disposed at one side of a test part 2, and a torsional vibration sensing part 20 disposed at the other side of the test part 2. The torsional vibration generating part 10 and the torsional vibration sensing part 20 are spaced apart by a predetermined distance.

The test part 2 may be any kind of mechanical part having an arbitrary cross-section and a predetermined length.

As shown in FIG. 5, each of the torsional vibration generating part 10 and the torsional vibration sensing part 20 includes a magnetostrictive body 1, a first magnetic field forming part, and a second magnetic field forming part.

The magnetostrictive body 1 is attached around the test part 2 and may be formed of one member as shown in FIG. 5. The magnetostrictive body 1 may be formed of a magnetic material selected from the group consisting of a ferromagnetic material such as Fe, Ni, and Co, alloys thereof, and a material having a large deformability.

The first magnetic field forming part forms a magnetic field around the test part 2 in a circumferential direction of the magnetostrictive body 1 and may be formed of a magnet 3 disposed in a circumferential direction of the magnetostrictive body 1, as shown in FIG. 5.

The second magnetic field forming part forms a magnetic field in a longitudinal direction of the test part 2 and includes an insulating body 4 wound around the test part 2 and spaced apart therefrom by a predetermined gap, and a coil 6 wound around the insulating body 4, as shown in FIGS. 4 and 5.

Meanwhile, as shown in FIG. 4, in order to change the intensity and frequency of the second magnetic field of the torsional vibration generating part 10, a function generator 40, a power amplifier 30, and an amperemeter 50 are connected to the coil 6 of the second magnetic field forming part.

In addition, as shown in FIG. 4, in order to sense the intensity and frequency of the second magnetic field of the torsional vibration sensing part 20 and display the sensed data, a pre-amplifier 60, an oscilloscope 70, and the amperemeter 50 are connected to the coil 6 installed at the second magnetic field forming part of the torsional vibration sensing part.

The apparatus generates torsional vibrations and simultaneously senses the torsional vibrations as follows.

That is, the torsional vibration generating part 10 generates torsional vibrations on the test part 2 by changing the intensity of a magnetic field formed by the second magnetic field forming part without changing the intensity of a magnetic field formed by the first magnetic field forming part so that the magnetostrictive body 1 undergoes shear deformation with respect to a longitudinal direction of the test part 2, using a magnetostrictive phenomenon.

In addition, the torsional vibration sensing part 20 measures torsional vibration characteristics of the test part 2 by sensing the variation in the intensity of a magnetic field around the magnetostrictive body 1 based on an inverse magnetostrictive phenomenon occurring from torsional vibrations generated by the torsional vibration generating part 10, when a magnetic field formed by the first magnetic field forming part is kept constant.

Meanwhile, the magnetostrictive body 1 and the first magnetic field forming part included in both the torsional vibration generating part 10 and the torsional vibration sensing part 20 may have various shapes and are not particularly limited to the shapes shown in FIG. 5.

FIGS. 6 through 10 are cross-sectional views of the magnetostrictive body 1 and the first magnetic field forming part employed in the apparatus for generating and sensing torsional vibrations according to other embodiments of the present invention.

Figure 6:
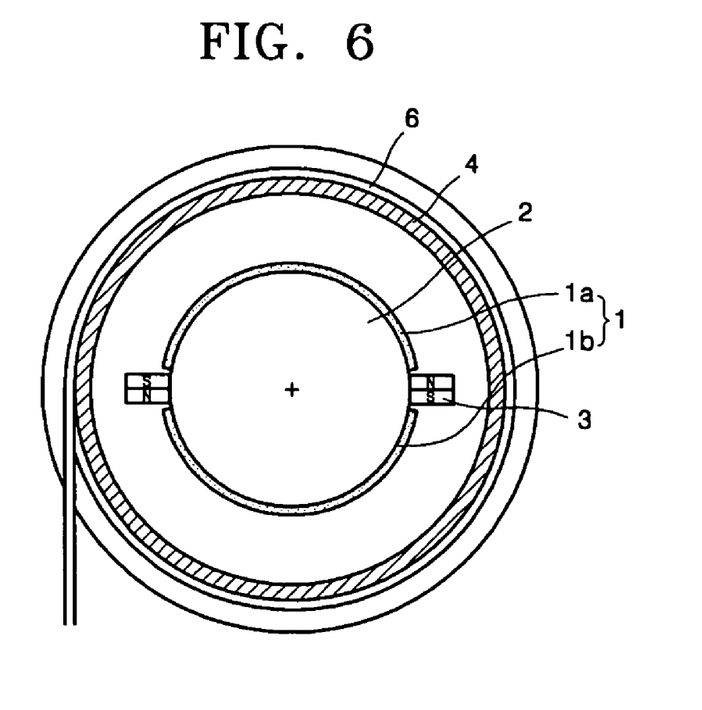
FIGS. 6 through 15 are cross-sectional views of a first magnetic field forming part shown in FIG. 5 according to embodiments of the present invention.

As shown in FIG. 6, the magnetostrictive body 1 may be formed of two pieces, unlike the embodiment of FIG. 5. That is, the magnetostrictive body 1 may be formed of magnetostrictive pieces 1a and 1b having the same size or different sizes. Magnets 3 constituting the first magnetic field forming part may be disposed in every gap between the magnetostrictive pieces 1a and 1b, or in one or some of the gaps between the magnetostrictive pieces 1a and 1b. However, in order to uniformly apply torsional vibrations around the test part 2 by deforming the magnetostrictive body 1, the magnetostrictive pieces 1a and 1b of equal sizes may be disposed at substantially equal intervals, and the magnets 3 may be disposed in every gap between the magnetostrictive pieces 1a and 1b.

Figure 7:
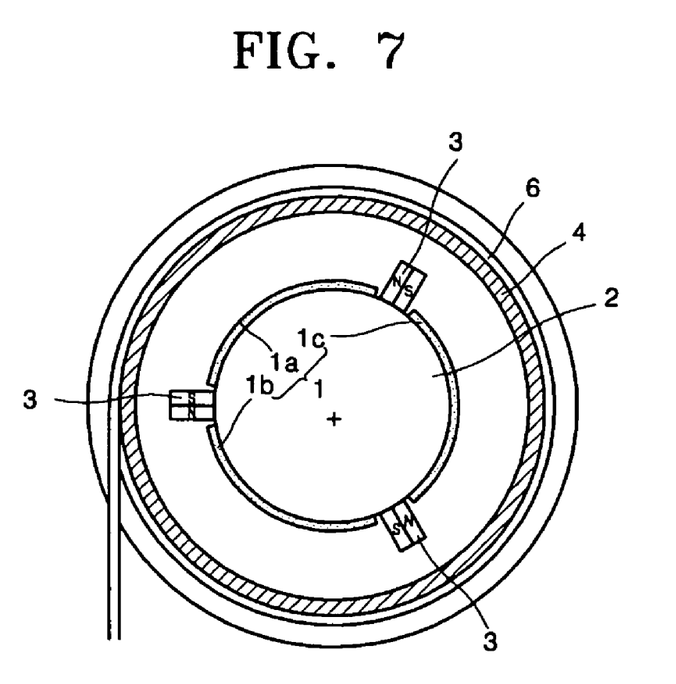

When the test part 2 has a large cross-sectional diameter, the number of magnetostrictive pieces 1a and 1b may be higher and the magnets 3 may be disposed in every gap therebetween such that the magnetic field is uniformly formed around the test part 2. For example, as shown in FIG. 7, the magnetostrictive body 1 may be formed of three pieces 1a, 1b and 1c disposed at equal intervals from each other. Such an arrangement is particularly advantageous when the test part 2 has a larger diameter.

The magnetostrictive pieces are attached to the test part using one adhesive material selected from the group consisting of epoxy, strong adhesive agents, and tapes.

Figure 8:
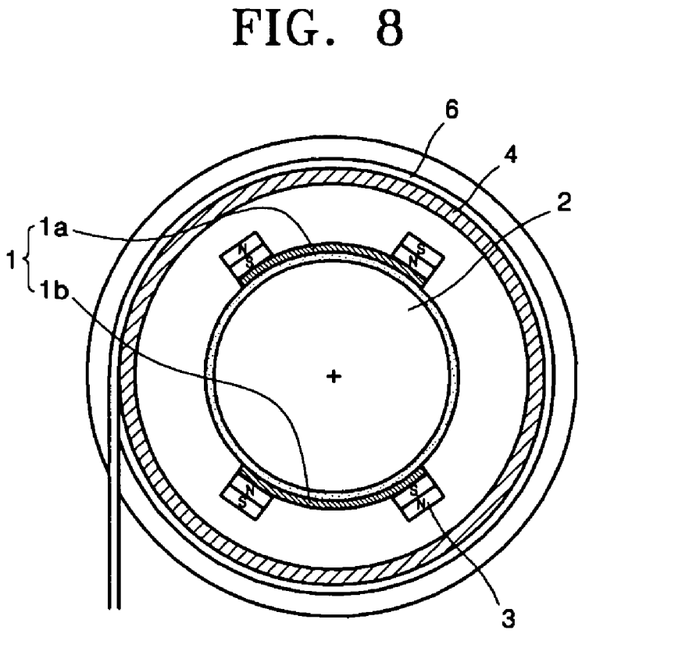

FIG. 8 illustrates an example when the magnets 3 are installed on a surface of the magnetostrictive body 1. As shown in FIG. 8, the magnetostrictive body 1 has a predetermined number of magnetostrictive pieces 1a and 1b, and the magnets 3 are respectively attached to opposite ends of the magnetostrictive pieces 1a and 1b. The magnets 3 are disposed to have different polarities on the opposite surfaces of the magnetostrictive pieces 1a and 1b. This creates magnetic fields passing through the magnetostrictive pieces 1a and 1b.

In the embodiment shown in FIG. 8, the magnetic fields pass through the magnetostrictive body 1 having high magnetic permeability at the side that the magnets 3 remain in contact with the magnetostrictive body 1, but the magnetic fields pass through the air of low magnetic permeability at the opposite side, thus causing a relatively great deal of magnetic flux to be leaked.

Figure 9:
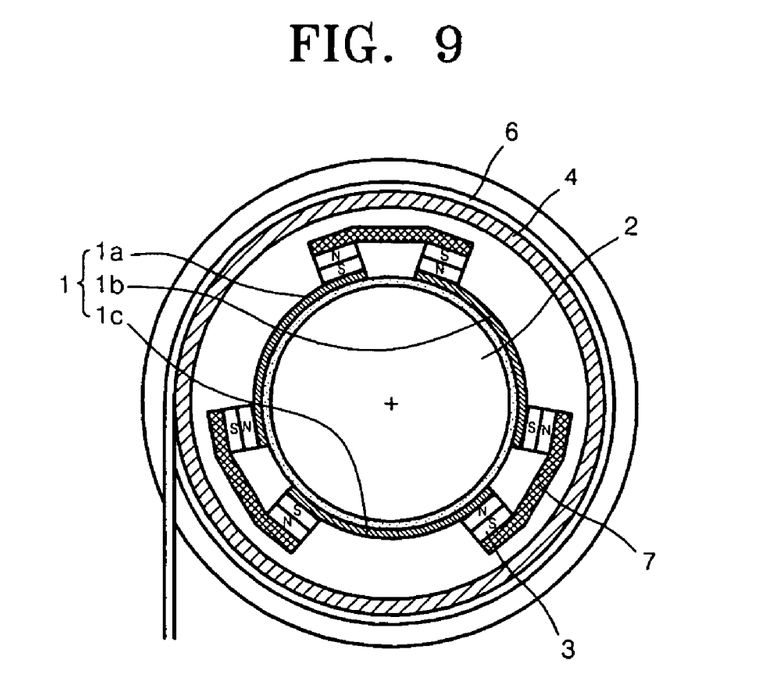

FIG. 9 illustrates an example where magnetic flux leakage is reduced in comparison with the embodiment shown in FIG. 8. In order to reduce the magnetic flux leakage, there are further provided yokes 7 that interconnect those polarities opposite to the polarities of the magnets 3 in contact with the magnetostrictive pieces 1a, 1b and 1c. The yokes may be formed of a material having higher magnetic permeability than air.

Figure 10:
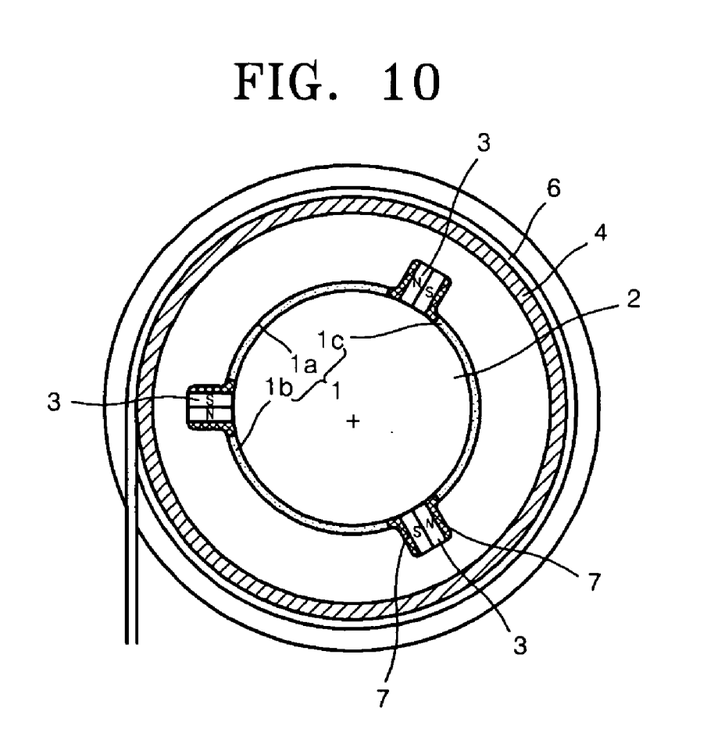

FIG. 10 illustrates an example where magnets 3 and yokes 7 are arranged in the gaps between magnetostrictive pieces 1a and 1b. The magnets 3 are installed to form magnetic fields in a direction parallel to a tangential line of a cross-section of the test part 2 around the test part 2, and the yokes 7 are installed to interconnect the magnets 3 and the magnetostrictive pieces 1a and 1b. In the present embodiment, the magnets 3 are installed to contact the test part 2, like in the embodiment shown in FIG. 5 or 6. In addition, the yokes 7 formed of a material having high magnetic permeability are installed between the magnets 3 and the magnetostrictive body 1 so that they can contact the test part 2. The yokes 7 make it possible to reduce the magnetic flux leakage which would otherwise occur through air between the magnets 3 and the magnetostrictive body 1 as shown in the embodiment of FIGS. 5 through 7.

Figure 11:
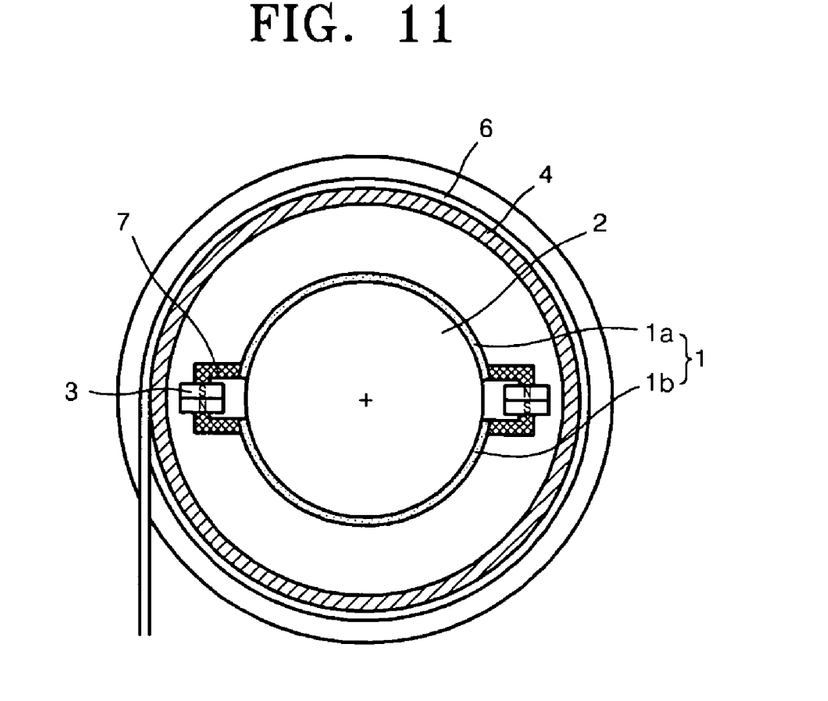

FIG. 11 shows an example where magnets 3 are spaced apart from a test part 2 by yokes 7, unlike the embodiment shown in FIG. 10. The magnets 3 may be installed either in direct contact with the test part 2 as shown in FIGS. 5 through 7 and 10, or spaced apart from the test part 2 as shown in FIG. 11.

Figure 12:
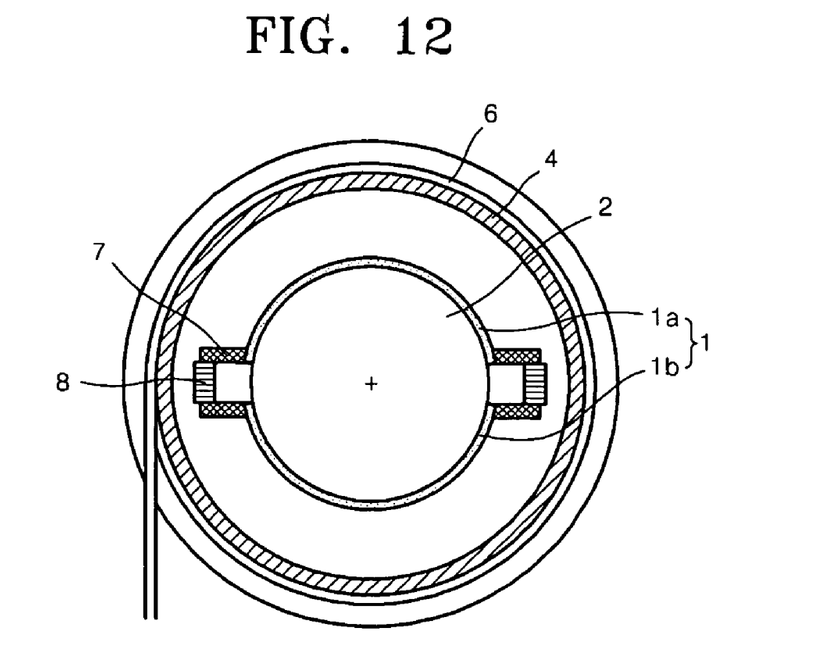

FIG. 12 illustrates an example where electromagnets 8 are employed instead of the permanent magnets 3 shown in FIG. 11, in order to form a magnetic field. In this case, a separate wire must be connected to each coil of the electromagnets for forming a first magnetic field. The use of the electromagnet 8 is advantageous in that the intensity of the first magnetic field formed by the electromagnet 8 can be changed to thereby create variable torsional vibrations in the torsional vibration generating part.

Figure 13:
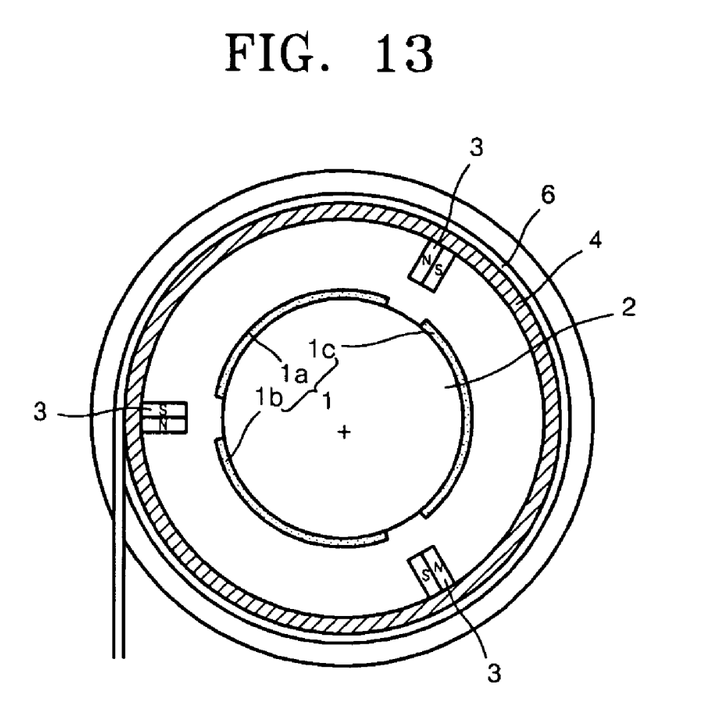

FIG. 13 illustrates an example where magnets 3 are supported in direct contact with an insulating body 4. In this case, bonding means such as an adhesive agent, an adhesive tape, or the like may be used to support the magnets 3 on the insulating body 4.

In the arrangement shown in FIG. 13, when the torsional vibration generating part 10 and the torsional vibration sensing part 20 are installed on the test part 2, the magnets 3 can be mounted by attaching the magnetostrictive body 1 to the test part 2 and then installing the insulating body 4 that contains the magnets 3 therein. This removes the need to attach the magnets 3 to the test part 2 one by one.

However, when the magnets 3 are supported within the insulating body 4 as shown in FIG. 13, most likely the magnets 3 would lie too far from the test part 2 because an inner surface of the insulating body 4 is spaced part from an outer surface of the test part 2.

Figure 14:
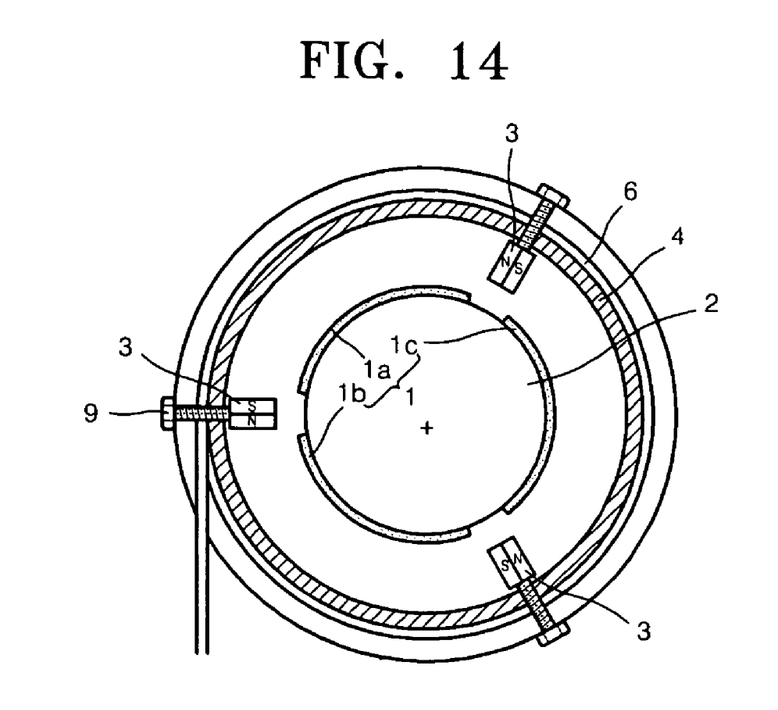
Figure 15:
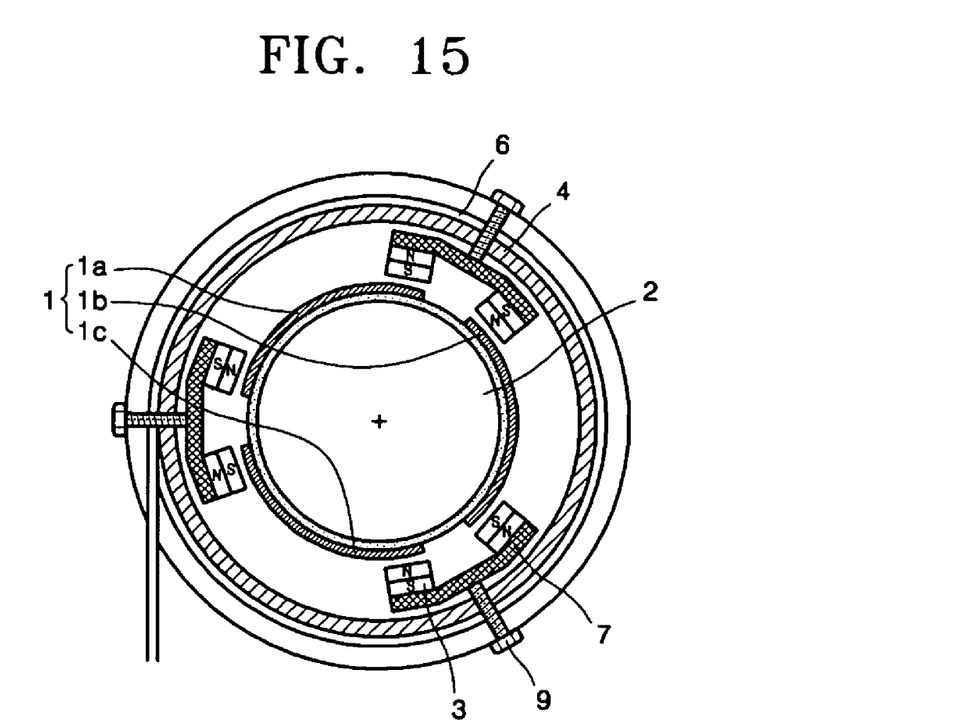

FIG. 14 illustrates an example where the magnets 3 are supported by the insulating body 4 through the use of position adjustment members 9, and FIG. 15 illustrates an example where the magnets 3 are supported by the insulating body 4 through the use of yokes 7 and position adjustment members 9 in case that the yokes 7 interconnect the magnets 3 as shown in FIG. 9.

By additionally attaching the position adjustment members 9 to the insulating body 4 as shown in FIGS. 14 and 15 in an effort to eliminate the problems posed by the embodiment shown in FIG. 13, a user can readily adjust the distance between the magnets 3 and the test part 2 or the distance between the magnets 3 and the insulating body 4, if needed. The position adjustment members 9 may be embodied in a variety of types, including a combination of bolts and nuts as shown in the drawings.

When using the apparatus of the present invention, modal testing may be performed in the following manner. After determining a vibration generating position and a vibration sensing position on the test part 2, magnetostrictive pieces are respectively installed at the two positions. Then, a first magnetic field is formed around the magnetostrictive pieces, and a second magnetic field is formed around the magnetostrictive body 1 in a direction substantially perpendicular to the first magnetic field. The first and second magnetic fields may be formed according to one of the embodiments described hereinbefore. Subsequently, the intensity of the second magnetic field formed around the magnetostrictive body 1 which is attached at the vibration generating position is changed to generate torsional vibrations on the test part 2. The vibrations thus generated serves to change the intensity of the second magnetic field by an inverse magnetostrictive effect that occurs around the magnetostrictive body 1 attached at the vibration sensing position. The change of the second magnetic field formed around the magnetostrictive body 1, which is attached at the vibration sensing position, is sensed to measure torsional vibrations. By analyzing the generated and sensed torsional vibration, the natural frequency and mode shape of the test part 2 can be determined.

Figure 16:
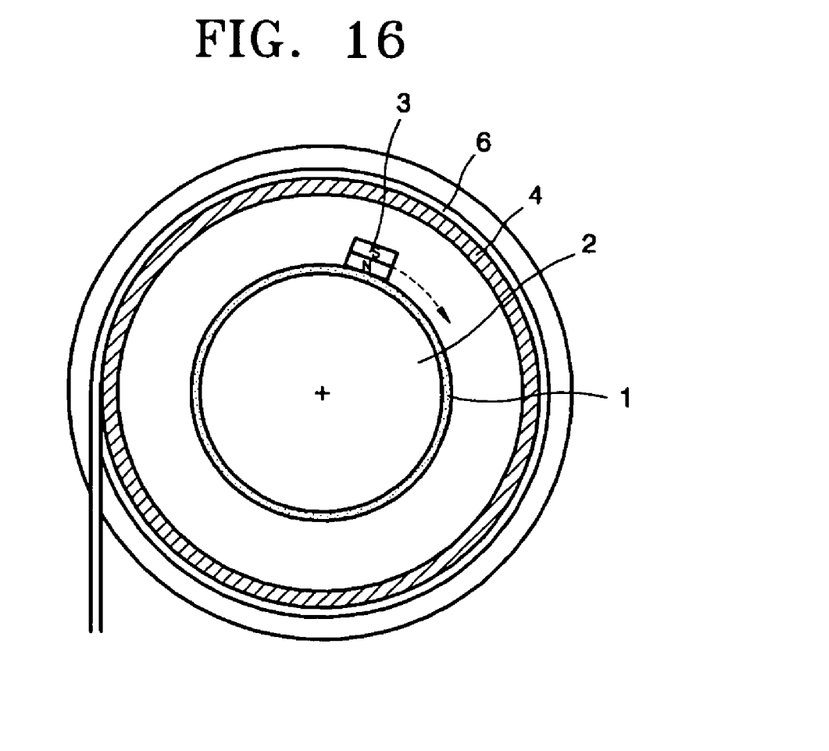
FIG. 16 is a cross-sectional view for explaining a pre-magnetization method of a magnetostrictive body adapted for a method of generating and sensing torsional vibrations using magnetostriction according to an embodiment of the present invention.

The first magnetic field may be formed without using the various kinds of magnetic field forming structures described hereinbefore. FIG. 16 is a cross-sectional view for explaining a method of forming a magnetic field around the test part 2 only when the modal testing is carried out.

Referring to FIG. 16, modal testing is performed after the magnets 3 are rubbed along the magnetostrictive body 1 for pre-magnetization, instead of fixedly installing a separate magnetic field forming part on the test part 2.

While the foregoing description has been made with respect to a magnetostrictive body having one, two, or three of magnetostrictive pieces and three or less magnets, it will be appreciated that the number of magnetostrictive pieces and magnets is not particularly limited to the ones illustrated hereinbefore without departing from the scope of the present invention. Furthermore, the magnetostrictive body may be in the form of a thin strip shape as shown in the drawings, but is not limited thereto.

Modal testing can be conducted on a part such as a pipe, a beam, a bar, a shaft, or the like, by using the apparatus and method for generating and sensing torsional vibrations in accordance with the present invention.

Figure 17:
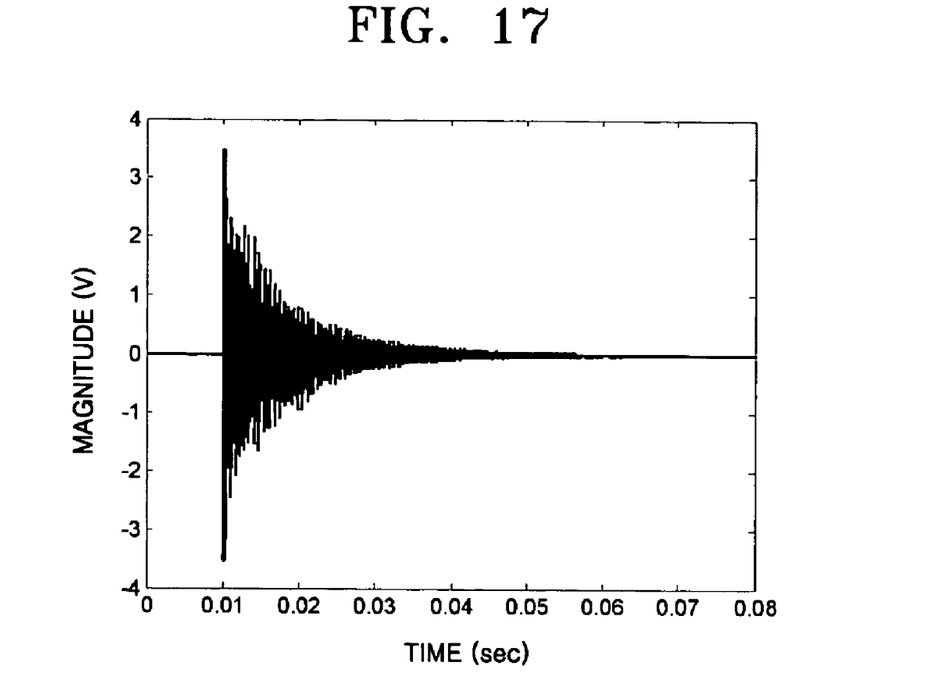
FIG. 17 is a graph showing the measured signal of torsional vibrations of a test part, sensed when modal testing the test part using an apparatus and a method of generating and sensing torsional vibrations according to an embodiment of the present invention.
Figure 18:
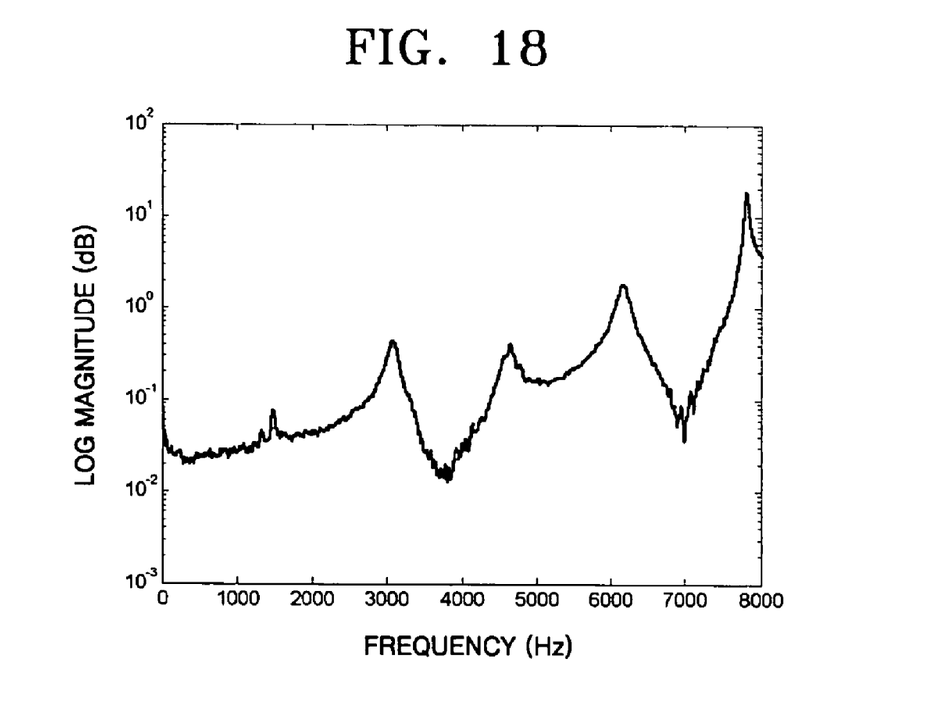
FIG. 18 is a graph showing a frequency response function for determining a natural frequency of a test part, acquired when modal testing the test part using an apparatus and a method of generating and sensing torsional vibrations according to an embodiment of the present invention.
Figure 19:
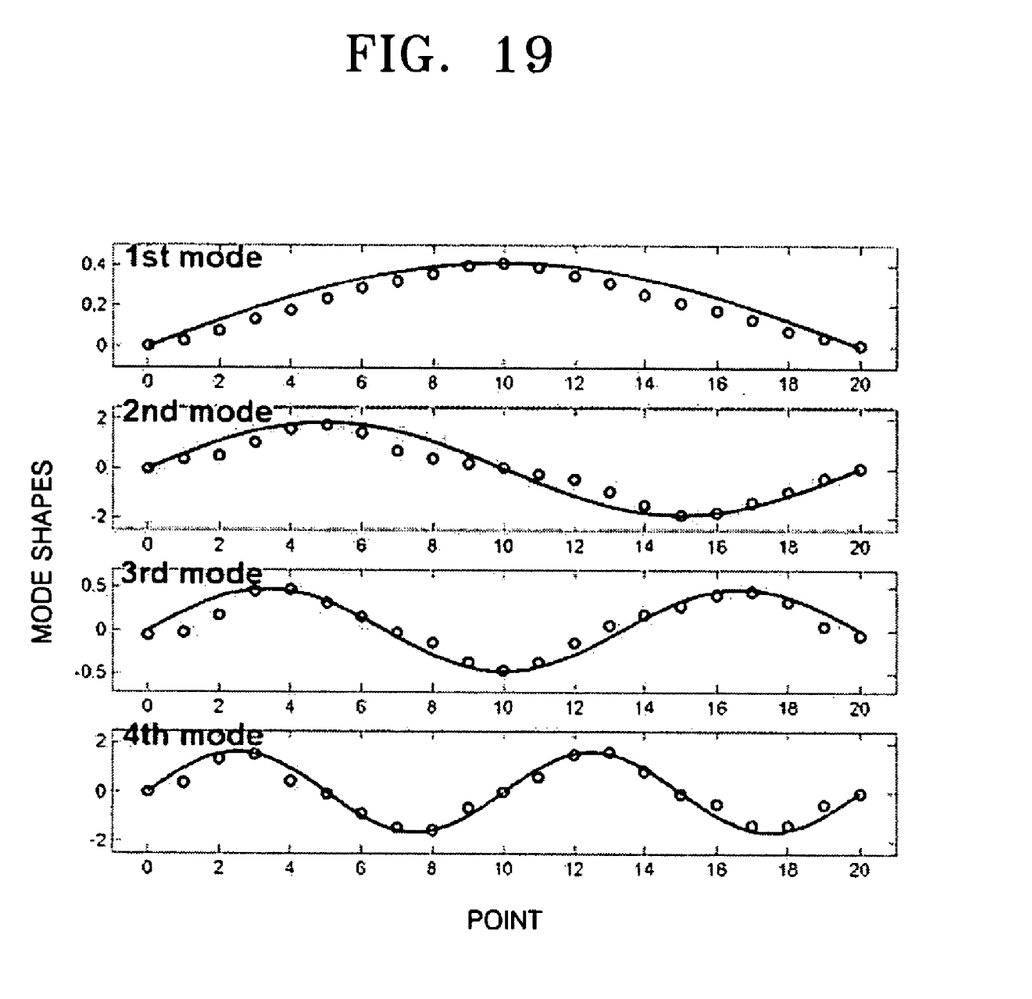
FIG. 19 is a graph showing vibration modes of a test part, obtained when modal testing the test part using an apparatus and a method of generating and sensing torsional vibrations according to an embodiment of the present invention.

FIGS. 17 through 19 illustrate graphs showing modal testing results obtained when testing a pipe using the apparatus and method for generating and sensing torsional vibrations in accordance with the present invention.

The test pipe is made of aluminum and has an outer diameter of 25 mm, a thickness of 1.8 mm, and a length of 1 m. Both ends of the aluminum pipe are left free during modal testing.

FIG. 17 shows torsional vibration signals obtained by using the apparatus and method for generating and sensing torsional vibrations of the present invention when testing the above pipe.

In addition, by using the apparatus and method for generating and sensing torsional vibrations of the present invention, it is possible to obtain the frequency response function of the pipe as shown in FIG. 18, and the torsional vibration modes of the pipe as shown in FIG. 19.

FIG. 18 is a graph representing the frequency response function (log magnitude versus frequency) of the test pipe. In FIG. 18, the peak of the frequency response function corresponds to the natural frequency of the test pipe.

FIG. 19 shows the theoretical (solid line) and experimental (circles) torsional vibration modes of the test pipe. After the natural frequency and the vibration modes of the pipe are obtained as shown in FIGS. 18 and 19, they are accounted for when designing the machine having the pipe as a part.

In other words, the machine parts are designed such that the frequencies of vibrations generated when they are used for various operations avoid the natural frequencies of them. Thus, it is possible to prevent the machine parts from breaking, which would otherwise take place when the vibration frequencies of the parts during operations of a machine are equal to the resonance frequencies.

As described above, the present invention provides an apparatus and a method for stably generating torsional vibrations and sensing the torsional vibrations using magnetostrictive effect and inverse magnetostrictive effect when performing the modal testing of a machine part such as a pipe, a beam, a bar, a shaft, or the like.

The apparatus and method according to the present invention can accurately and conveniently perform the modal testing of the machine part about torsional vibrations, and use the results of the testing in designing machines including the machine part. Accordingly, it is possible to manufacture machine parts with improved structural stability.

In addition, since torsional vibrations can be generated regardless of the intensity of a current applied to a coil, modal testing of a machine part can be performed with improved repeatability.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for generating and sensing torsional vibrations using magnetostriction, the apparatus comprising a torsional vibration generating part transmitting torsional vibrations to a test part having an arbitrary cross-section and a predetermined length, and a torsional vibration sensing part sensing the torsional vibrations generated from the torsional vibration generating part, wherein the torsional vibration generating part and/or the torsional vibration sensing part comprises:

a magnetostrictive body that is attached around the test part and is made of a magnetostriction material;

a first magnetic field forming part forming a magnetic field in a circumferential direction of the test part along with the magnetostrictive body; and a second magnetic field forming part forming a magnetic field around the magnetostrictive body in a direction substantially perpendicular to the direction of the magnetic field formed by the first magnetic field forming part and in parallel with a longitudinal direction of the test part, wherein the magnetostrictive body is segmented into a predetermined number of magnetostrictive pieces in a circumferential direction of the test part, wherein the magnetostrictive pieces are substantially the same size and attached around the test part at substantially equal intervals from each other in a circumferential direction of the test part.

2. The apparatus of claim 1, wherein the magnetostrictive pieces are attached to the test part using one adhesive material selected from the group consisting of epoxy, strong adhesive agents, and tapes.

3. The apparatus of claim 1, wherein the first magnetic field forming part comprises predetermined number of magnets disposed between the magnetostrictive pieces.

4. The apparatus of claim 3, wherein the magnet is an electromagnet.

5. The apparatus of claim 3, further comprising: predetermined number of yokes that are disposed between the magnetostrictive pieces and the magnets, and made of a material having magnetic permeability higher than air.

6. The apparatus of claim 5, wherein the magnet is an electromagnet.

7. The apparatus of claim 1, wherein the magnetostrictive body is made of a material having a large magnetostrictive deformation and selected from the group consisting of a ferromagnetic material including Fe, Ni, and Co, and alloys thereof.

8. The apparatus of claim 1, wherein the torsional vibration generating part generates torsional vibrations on the test part by changing an intensity of the magnetic field formed by the second magnetic field forming part without changing an intensity of the magnetic field formed by the first magnetic field forming part, so that the magnetostrictive body is deformed in a direction inclined with respect to the longitudinal direction of the test part by a magnetostrictive effect.

9. The apparatus of claim 1, wherein the torsional vibration sensing part measures torsional vibrations of the test part by sensing an intensity variation of the magnetic field formed by the second magnetic field forming part due to an inverse magnetostrictive effect occurring due to torsional vibrations generated in the torsional vibration generating part, when the magnetic field formed by the first magnetic field forming part is kept constant.

10. The apparatus of claim 1, wherein the second magnetic field forming part included in the torsional vibration generating part comprises: an insulating body spaced apart from the test part by a predetermined gap and surrounding the test part; and a coil wound on a peripheral surface of the insulating body, whereby a current flowing through the coil is adjusted to change the intensity of the magnetic field formed by the second magnetic field forming part.

11. The apparatus of claim 1, wherein the second magnetic field forming part included in the torsional vibration sensing part comprises: an insulating body spaced apart from the test part by a predetermined gap and surrounding the test part; and a coil wound on a peripheral surface of the insulating body, whereby the torsional vibrations are sensed according to the electric potential difference at both ends of the coil.

12. A method of generating and sensing torsional vibrations using magnetostriction, comprising:

determining a vibration generating position and a vibration sensing position of a test part and installing a magnetostrictive body segmented into at least two magnetostrictive pieces at a predetermined interval from each other in a circumferential direction of the test part at each position, wherein the magnetostrictive pieces are substantially the same size and attached at substantially equal intervals from each other;

forming a first magnetic field in a circumferential direction of the test part along with the magnetostrictive pieces at the each position;

forming second magnetic field in a direction substantially perpendicular to the first magnetic field at the magnetostrictive piece where the first magnetic field is formed at the each position;

changing an intensity of the second magnetic field around the magnetostrictive piece attached at the vibration generating position to generate torsional vibrations on the test part; and sensing the change of the intensity of the second magnetic field around the magnetostrictive piece attached at the vibration sensing position to sense the torsional vibrations.

13. The method of claim 12, wherein the forming the first magnetic field is performed by rubbing a magnet along the magnetostrictive piece to pre-magnetize the magnetostrictive piece.

* * * * *